US012761515B2

(12) United States Patent
Cho et al.

(10) Patent No.: US 12,761,515 B2
(45) Date of Patent: Oct. 13, 2026

(54) OPTICAL DISPLAY APPARATUS

(71) Applicant: SAMSUNG SDI CO., LTD., Yongin-si (KR)

(72) Inventors: Kyoung Min Cho, Suwon-si (KR); Bong Choon Kim, Suwon-si (KR); Jung Hun You, Suwon-si (KR); Seon Gyeong Jeong, Suwon-si (KR); Seong Hoon Lee, Suwon-si (KR)

(73) Assignee: HOARDSUN HENGXIN(WUXI) MATERIALS CO., LTD., Wuxi (CN)

( * ) Notice: Subject to any disclaimer, the term of this patent is extended or adjusted under 35 U.S.C. 154(b) by 0 days.

(21) Appl. No.: 18/649,641

(22) Filed: Apr. 29, 2024

(65) Prior Publication Data

US 2024/0369880 A1 Nov. 7, 2024

(30) Foreign Application Priority Data

May 4, 2023 (KR) ........................ 10-2023-0058236

(51) Int. Cl.
*G02F 1/13363* (2006.01)
*G02B 5/30* (2006.01)
*G02F 1/1337* (2006.01)

(52) U.S. Cl.
CPC ....... *G02F 1/13363* (2013.01); *G02B 5/3083* (2013.01); *G02F 1/13378* (2013.01); *G02F 2413/02* (2013.01); *G02F 2413/06* (2013.01)

(58) Field of Classification Search
CPC ........... G02F 2413/06; G02F 1/134363; G02F 1/134372
See application file for complete search history.

(56) References Cited

U.S. PATENT DOCUMENTS

2005/0140900 A1 6/2005 Jeon et al.
2005/0200792 A1* 9/2005 Jeon .................. G02F 1/133634 349/120
2008/0239223 A1* 10/2008 Fujita ................ G02F 1/134363 349/138
2009/0002606 A1* 1/2009 Tomonaga ........ G02F 1/133634 349/96
2021/0116761 A1 4/2021 Kim et al.
(Continued)

FOREIGN PATENT DOCUMENTS

JP 2006251659 A 9/2006
JP 2022-146118 A 10/2022
(Continued)

OTHER PUBLICATIONS

Taiwanese Office Action issued in corresponding TW Application No. 113116444, dated Jan. 15, 2025, 6 pages.
(Continued)

*Primary Examiner* — Alexander P Gross
(74) *Attorney, Agent, or Firm* — Ricky Lam

(57) ABSTRACT

An optical display apparatus includes a liquid crystal panel and a viewer-side polarizing plate stacked on a surface of the liquid crystal panel, and the liquid crystal panel includes a liquid crystal layer having a pre-tilt angle of 2° to 5°, and the viewer-side polarizing plate includes a first retardation layer including a positive A layer, a second retardation layer including a positive C layer, and a polarizer sequentially stacked from the liquid crystal panel, and satisfies Equation 1.

15 Claims, 2 Drawing Sheets

(56) References Cited

U.S. PATENT DOCUMENTS

| | | | | |
|---|---|---|---|---|
| 2021/0294013 | A1* | 9/2021 | Ota | G02B 5/3083 |
| 2023/0408860 | A1 | 12/2023 | Hong et al. | |

FOREIGN PATENT DOCUMENTS

| | | | |
|---|---|---|---|
| KR | 10-2010-0007847 | A | 1/2010 |
| KR | 10-2019-0137723 | A | 12/2019 |
| KR | 10-2022-0059860 | A | 5/2022 |
| TW | 200521577 | A | 7/2005 |
| TW | 200734738 | A | 9/2007 |

OTHER PUBLICATIONS

Korean Office Action issued in corresponding KR Application No. 10-2023-0058236, dated Feb. 2, 2025, 7 pages.

* cited by examiner

OPTICAL DISPLAY APPARATUS

CROSS-REFERENCE TO RELATED APPLICATION

The present application claims priority and the benefit of Korean Patent Application No. 10-2023-0058236, filed on May 4, 2023 in the Korean Intellectual Property Office, the entire disclosure of which is incorporated herein by reference.

BACKGROUND

1. Field

Aspects of embodiments of the present invention relate to an optical display apparatus.

2. Description of the Related Art

A liquid crystal display includes a liquid crystal panel, a viewer-side polarizing plate stacked on a surface of the liquid crystal panel, and a light source-side polarizing plate stacked on another surface of the liquid crystal panel.

For liquid crystal displays, an in-plane switching mode is used as a liquid crystal drive mode to increase light viewing angle. The in-plane switching mode is a drive mode in which liquid crystals are horizontally aligned. The in-plane switching mode may include any of an in-plane switching (IPS) mode, a fringe field switching (FFS) mode, a ferroelectric liquid crystal (FLC) mode, and the like.

In the in-plane switching mode, liquid crystals may be aligned by optical alignment as a chemical method, or rubbing as a physical method. In particular, rubbing, which is a physical method, is a process of attaching a polymer film or an alignment layer formed of an alignment agent to a substrate for a liquid crystal panel, rubbing the polymer film or the alignment layer with fibers to form a groove in a certain direction, and aligning liquid crystals along the groove. The physical method has an advantage of a high response speed of the liquid crystals through tilting of the liquid crystals.

The background technique of the present invention is disclosed in Japanese Unexamined Patent Publication No. 2006-251659 and the like.

SUMMARY

According to an aspect of embodiments of the present invention, an optical display apparatus that prevents (prevents or substantially prevents) occurrence of a reddish region due to a liquid crystal layer and has good screen quality with good black visibility is provided.

According to another aspect of embodiments of the present invention, an optical display apparatus that increases contrast ratio and viewing angle while minimizing or reducing color shift is provided.

According to another aspect of embodiments of the present invention, an optical display apparatus that minimizes or reduces deterioration in visibility of color deviation in all directions due to a change in tilt angle of liquid crystals in operation is provided.

According to one or more embodiments of the present invention, an optical display apparatus includes: a liquid crystal panel; and a viewer-side polarizing plate stacked on a surface of the liquid crystal panel, wherein the liquid crystal panel includes a liquid crystal layer having a pre-tilt angle of 2° to 5°, and the viewer-side polarizing plate includes a first retardation layer including a positive A layer, a second retardation layer including a positive C layer, and a polarizer stacked sequentially from the liquid crystal panel, and satisfies the following Relation 1:

$$Re1 - 205\ \text{nm} \geq Rth2, \qquad \text{Relation 1}$$

where Re1 is an in-plane retardation of the first retardation layer at a wavelength of 550 nm (unit: nm), and Rth2 is an out-of-plane retardation of the second retardation layer at a wavelength of 550 nm (unit: nm).

According to one or more embodiments of the present invention, an optical display apparatus that prevents (prevents or substantially prevents) occurrence of a reddish region due to a liquid crystal layer and has good screen quality with good black visibility is provided.

According to one or more embodiments of the present invention, an optical display apparatus that increases contrast ratio and viewing angle while minimizing or reducing color shift is provided.

According to one or more embodiments of the present invention, an optical display apparatus that minimizes or reduces deterioration in visibility of color deviation in all directions due to a change in tilt angle of liquid crystals in operation is provided.

DETAILED DESCRIPTION

Figure 1:
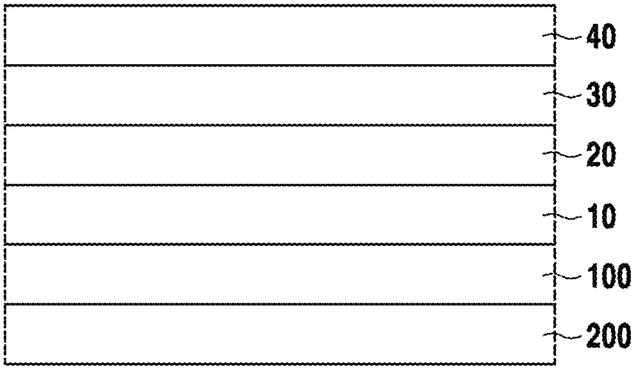
FIG. 1 is a cross-sectional view of an optical display apparatus according to an embodiment of the present invention.

Herein, some example embodiments of the present invention will be described in further detail with reference to the accompanying drawings such that the present invention can be easily implemented by a person having ordinary knowledge in the art. It is to be understood that the present invention may be embodied in different ways and is not limited to the following embodiments.

The terminology used herein is for the purpose of describing example embodiments and is not intended to limit the present invention. As used herein, the singular forms "a", "an", and "the" are intended to include the plural forms as well, unless the context clearly indicates otherwise.

In the drawings, components unrelated to description may be omitted for clear description of the invention, and like components will be denoted by like reference numerals throughout the specification. Although lengths, thicknesses or widths of various components may be exaggerated for understanding in the drawings, the present invention is not limited thereto.

Herein, spatially relative terms, such as "upper" and "lower," are defined with reference to the accompanying drawings. Thus, it is to be understood that the term "upper surface" can be used interchangeably with the term "lower surface," and when an element, such as a layer or a film, is referred to as being placed "on" another element, it may be directly placed on the other element, or one or more intervening elements may be present. On the other hand, when an element is referred to as being "placed directly on," "placed immediately on," "directly formed on," or "formed to directly contact" another element, there are no intervening element(s) therebetween.

Herein, "in-plane retardation Re," "out-of-plane retardation Rth," and "degree of biaxiality NZ" are represented by the following Equations A, B, and C, respectively:

$$Re = (nx - ny) \times d; \quad (A)$$

$$Rth = ((nx + ny)/2 - nz) \times d; \quad (B)$$

$$NZ = (nx - nz)/(nx - ny), \quad (C)$$

where nx, ny, and nz are indexes of refraction of an optical device in the slow axis direction, the fast axis direction, and the thickness direction of the optical device at a measurement wavelength, respectively, and d is the thickness thereof (unit: nm). The measurement wavelength may be 450 nm, 550 nm, and/or 650 nm.

Here, the x-axis direction is defined as the slow axis direction of the optical device, and the y-axis direction is defined as the fast axis direction thereof. The optical device may be a retardation layer (including a positive C layer, a positive A layer, and the like), a base layer, and/or a protective layer.

Here, "(meth)acryl" refers to acryl and/or methacryl.

As used herein to represent a specific numerical range, the expression "X to Y" means "greater than or equal to X and less than or equal to Y (X≤ and ≤Y)."

Figure 3:
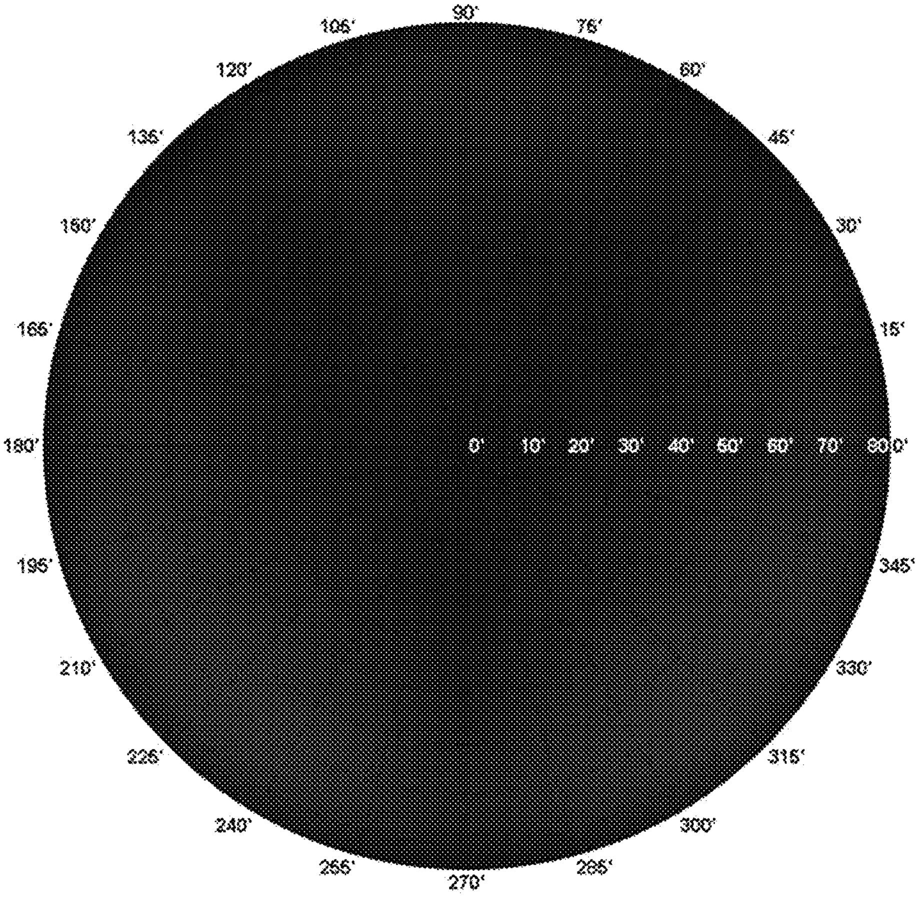
FIG. 3 shows a result indicating occurrence of a reddish region in a Comparative Example 1.

According to one or more embodiments, an optical display apparatus overcomes a problem of occurrence of a reddish region due to a liquid crystal layer. An optical display apparatus provided with a liquid crystal panel including a liquid crystal layer in an in-plane mode aligned by a physical method can have a reddish region due to the liquid crystal layer. As used herein, "reddish region" means that a reddish color is visible at a lateral side of a screen, as shown in FIG. 3. Further, according to one or more embodiments, the optical display apparatus increases contrast ratio and viewing angle while minimizing or reducing color shift. Further, according to one or more embodiments, the optical display apparatus minimizes or reduces deterioration in visibility of color deviation in all directions due to a change in tilt angle of the liquid crystal in operation.

According to one or more embodiments, the optical display apparatus includes: a liquid crystal panel; and a viewer-side polarizing plate stacked on a surface of the liquid crystal panel, wherein the liquid crystal panel includes a liquid crystal layer having a pre-tilt angle of 2° to 5°; and the viewer-side polarizing plate includes a first retardation layer including a positive A layer, a second retardation layer including a positive C layer, and a polarizer stacked sequentially from the liquid crystal panel and satisfies Relation 1 set forth below.

The optical display apparatus includes the liquid crystal panel, which includes the liquid crystal layer having a pre-tilt angle of 2° to 5°, and the viewer-side polarizing plate, thereby overcoming the problem of occurrence of a reddish region due to the liquid crystal layer and increasing contrast ratio and viewing angle while minimizing or reducing color shift and deterioration in visibility of color deviation in all directions due to change in tilt angle of liquid crystals.

Herein, the optical display apparatus will be described in further detail.

Liquid Crystal Panel

The liquid crystal panel can emit light received from a light source while aligning liquid crystals depending on application and non-application of voltage.

The liquid crystal panel may include a pair of substrates; a liquid crystal layer as a display medium disposed between the substrates; and a rubbed alignment layer formed on a surface of the liquid crystal layer. The substrate (color filter substrate) at a side may have a color filter and a black matrix stacked thereon. The substrate (active matrix substrate) at another side may include a switching element (e.g., TFT) that controls electro-optical properties of the liquid crystals, and signal lines and pixel lines that impart gate signals to the switching element, without being limited thereto.

In an embodiment, the liquid crystal panel may employ a liquid crystal layer in an IPS, FFS or FLC mode as a liquid crystal layer in a horizontal alignment mode. With this structure, the liquid crystal display can achieve improved viewing angle characteristics.

The liquid crystal panel, for example, the liquid crystal layer, has a pre-tilt angle of 2° to 5°. If the pre-tilt angle is greater than 5°, the optical display apparatus can suffer from too severe light leakage to realize a proper screen image. If the pre-tilt angle is less than 2°, the optical display apparatus cannot overcome the problem of occurrence of a reddish area even with the first retardation layer and the second retardation layer of the present invention.

The "pre-tilt angle" of the liquid crystal layer means a tilt angle of the liquid crystal layer when voltage is not applied to the liquid crystal panel or the liquid crystal layer. The pre-tilt angle may be caused by mechanical rubbing and increases with increasing rubbing strength. Higher rubbing strength provides higher anchoring energy of the liquid crystal layer, thereby providing an advantage of improving a response speed through strong returning force to an original position upon interruption of voltage application to the liquid crystal panel.

The "pre-tilt angle" of the liquid crystal layer may be calculated by measuring frontal retardation and inclined surface retardation of the liquid crystal layer and reflecting the index of refraction of liquid crystals in the liquid crystal layer. The pre-tilt angle of the liquid crystal layer may be easily measured by a typical retardation meter (for example, AxoScan), without being limited thereto.

The liquid crystal layer may be formed through alignment of liquid crystals on an alignment layer formed by a physical alignment method. For example, the method of forming the alignment layer may be as follows, without being limited thereto: a liquid crystal alignment agent (e.g., a predetermined liquid crystal alignment agent) is applied to a substrate by a suitable application method, for example, a roll coater method, a spin coat method, a printing method, an inkjet method, or the like. After application of the liquid crystal alignment agent, preliminary heating (prebaking) may be performed for the purpose of preventing or substantially preventing the applied alignment agent from dripping. The prebaking process may be performed at a temperature of, for example, 30° C. to 200° C., 40° C. to 150° C., or 40° C. to 100° C. The prebaking process may be performed for, for example, 0.25 minutes to 10 minutes, or 0.5 minutes to 5 minutes. In addition, it is desirable that additional heating (post-baking) be performed. The post-baking process may be performed at a temperature of, for example, 80° C. to 300° C., for example, 120° C. to 250° C. The post-baking process may be performed for, for example, 5 minutes to 200 minutes, or 10 minutes to 100 minutes. The alignment layer may have a thickness of, for example, 5 nm to 300 nm, or 10 nm to 200 nm.

The prepared alignment layer may be used for alignment of liquid crystals without additional processing. However, it is also possible to perform alignment capability-imparting treatment on the prepared alignment layer. The alignment capability-imparting treatment may be performed by rubbing the alignment layer in a certain direction with a roll of cloth formed of fibers, such as any of Nylon, Rayon, cotton, and the like.

The liquid crystal layer may be prepared by applying a certain amount (e.g., a predetermined amount) of liquid crystals to the alignment layer subjected to rubbing treatment, followed by curing. The liquid crystal layer may have positive birefringence and may have positive or negative permittivity anisotropy characteristics. Here, "positive birefringence" means that the liquid crystal layer has a high index of refraction in an optical axis direction, and may typically have a rod shape.

A pre-tilt angle of 2° to 5° of the liquid crystal layer may be realized by adjusting rubbing strength during the rubbing process when forming the liquid crystal layer. There can be a significant difference in response speed depending on the pre-tilt angle of the liquid crystal layer. In general, higher rubbing strength provides higher anchoring energy of the liquid crystal layer, allowing faster transition from a white state to a black state. A pre-tilt angle of 2° to 5° of the liquid crystal layer may provide a drawback of severe color shift, despite an advantage of fast response.

The liquid crystal layer or the liquid crystal panel may have an in-plane retardation (Δnd) of 330 nm to 380 nm at a wavelength of 550 nm. Within this range, the liquid crystal layer or the liquid crystal panel can have a maximum light transmittance. Depending on panel mode, the in-plane retardation (Δnd) with the maximum transmittance may be changed. Typically, the in-plane retardation (Δnd) with the maximum transmittance can be higher in FFS mode than in IPS mode. That is, since the FFS mode has more longitudinal and twisted liquid crystal morphologies than the IPS mode despite lateral switching of most liquid crystals upon application of voltage, higher in-plane retardation (Δnd) is required to achieve the maximum transmittance.

According to an embodiment, the slow axis of the liquid crystal layer may be substantially orthogonal to the light absorption axis of the polarizer of the viewer-side polarizing plate in the optical display apparatus.

Viewer-Side Polarizing Plate

The viewer-side polarizing plate includes a first retardation layer including a positive A layer, a second retardation layer including a positive C layer, and a polarizer stacked sequentially from the liquid crystal panel, and satisfies the following Relation 1:

$$Re1 - 205\text{ nm} \geq Rth2, \qquad \text{Relation 1}$$

where Re1 is an in-plane retardation of the first retardation layer at a wavelength of 550 nm (unit: nm), and Rth2 is an out-of-plane retardation of the second retardation layer at a wavelength of 550 nm (unit: nm).

Relation 1 is devised for the viewer-side polarizing plate that does not allow occurrence of a reddish region due to the liquid crystal layer and provides good screen quality with good black visibility when the liquid crystal layer has a pre-tilt angle of 2° and 5°. Relation 1 may be efficiently applied when the viewer-side polarizing plate includes the positive A layer and the positive C layer. When Relation 1 is satisfied, the optical display apparatus does not allow occurrence of a reddish region due to the liquid crystal layer, has good screen quality with good black visibility, and can increase contrast ratio and viewing angle while minimizing or reducing color shift and deterioration in visibility of color deviation in all directions due to a change in pre-tilt angle of the liquid crystals even when the liquid crystal layer has a pre-tilt angle of 2° and 5°.

In an embodiment, in Relation 1, Re1-205 nm becomes greater than Rth2 (Re1−205 nm>Rth2). In this case, the optical display apparatus does not allow any occurrence of a reddish region due to the liquid crystal layer.

Relation 1 may be realized by adjusting the in-plane retardation (Re1) of the first retardation layer, and, in an embodiment, the positive A layer, and the out-of-plane retardation (Rth2) of the second retardation layer, and, in an embodiment, the positive C layer. In an embodiment, "Re1−205 nm" in Relation 1 may be in a range from −100 nm to −60 nm, and, in an embodiment, −90 nm to −65 nm, for example, −100 nm, −99 nm, −98 nm, −97 nm, −96 nm, −95 nm, −94 nm, −93 nm, −92 nm, −91 nm, −90 nm, −89 nm, −88 nm, −87 nm, −86 nm, −85 nm, −84 nm, −83 nm, −82 nm, −81 nm, −80 nm, −79 nm, −78 nm, −77 nm, −76 nm, −75 nm, −74 nm, −73 nm, −72 nm, −71 nm, −70 nm, −69 nm, −68 nm, −67 nm, −66 nm, −65 nm, −64 nm, −63 nm, −62 nm, −61 nm, or −60 nm.

According to an embodiment, in the viewer-side polarizing plate, only the first retardation layer and the second retardation layer may be present as retardation layers between the polarizer and the liquid crystal panel. As used herein, "retardation layer" means a retardation layer having an in-plane retardation of greater than 10 nm at a wavelength of 550 nm.

First Retardation Layer

The first retardation layer includes a positive A layer. The positive A layer satisfies a relation: nx>ny≈nz (where nx, ny, and nz are the indexes of refraction of the positive A retardation layer in the slow axis direction, the fast axis direction, and the thickness direction thereof at a wavelength of 550 nm, respectively).

In an embodiment, the positive A layer may have an in-plane retardation at a wavelength of 550 nm of 100 nm to 160 nm, for example, 100 nm, 105 nm, 110 nm, 115 nm, 120 nm, 125 nm, 130 nm, 135 nm, 140 nm, 145 nm, 150 nm, 155 nm, or 160 nm, and, in an embodiment, 110 nm to 150 nm, 110 nm to 140 nm, 115 nm to 150 nm, or 120 nm to 140 nm. Within this range, the viewer-side polarizing plate can easily satisfy Relation 1 and can easily overcome the problem of occurrence of a reddish region due to the liquid crystal layer even with the liquid crystal layer having a pre-tilt angle of 2° to 5°.

In an embodiment, the positive A layer may have an out-of-plane retardation of 50 nm to 80 nm, for example, 50 nm, 55 nm, 60 nm, 65 nm, 70 nm, 75 nm, or 80 nm, at a wavelength of 550 nm. Within this range, the above in-plane retardation can be easily achieved.

In an embodiment, the positive A layer may have a degree of biaxiality of 0.9 to 1.1 at a wavelength of 550 nm, for example, 0.9, 0.95, 1.0, 1.05, or 1.1. Within this range, the above in-plane retardation can be easily achieved.

The positive A layer may exhibit negative wavelength dispersion or flat wavelength dispersion. "Negative wavelength dispersion" means that in-plane retardation increases with increasing wavelength. "Flat wavelength dispersion" means that in-plane retardation is substantially uniform with increasing wavelength.

In an embodiment, the positive A layer may have an Re(450)/Re(550) value of less than 1.05, for example, 0.8 to less than 1.05. The positive A layer may have an Re(650)/Re(550) value of greater than 0.97, for example, greater than 0.97 to 1.1. Re(450), Re(550), and Re(650) refer to in-plane retardation values of the positive A layer at wavelengths of 450 nm, 550 nm, and 650 nm, respectively.

The positive A layer may be formed of any suitable material so long as the positive A layer can realize the aforementioned retardation and dispersion characteristics.

In an embodiment, the positive A layer may be formed of a non-liquid crystalline composition. For example, the positive A layer may be a polymer film and may include a film including at least one selected from among, for example, cellulose ester based resins including triacetylcellulose and the like; cyclic olefin polymer (COP) based resins including norbornene, amorphous cyclic polyolefin, and the like; polycarbonate based resins; polyester based resins including polyethylene terephthalate, polybutylene terephthalate, polyethylene naphthalate, polybutylene naphthalate, and the like; polyethersulfone based resins; polysulfone based resins; polyamide based resins; polyimide based resins; non-cyclic polyolefin based resins; poly(meth)acrylate based resins including poly(methyl (meth)acrylate) resins and the like; polyvinyl alcohol based resins; polyvinyl chloride based resins; and (meth)acrylic based resins.

In another embodiment, the positive A layer may be formed of a liquid crystalline composition. For example, the liquid crystalline composition may contain a reactive mesogen. The reactive mesogen is a reactive liquid crystal monomer having a photo-polymerizable functional group and can realize phase retardation when cured through optical alignment, physical alignment or mechanical alignment. The reactive mesogen may include a unit, such as a biphenyl group, a phenyl benzoate group, a phenyl cyclohexane group, an azoxybenzene group, an azomethine group, a phenyl pyrimidine group, a diphenyl acetylene group, a diphenyl benzoate group, a bicyclohexane group, a cyclohexyl benzene group, a terphenyl group, and the like, as the mesogen group. These units may further include a substituent group, such as a cyano group, an alkyl group, an alkoxy group, a halogen, and the like, at terminals thereof. The liquid crystalline composition may further include a polymerizable liquid crystal monomer, a polymerizable monomer, a crosslinking agent, an initiator, and the like. In an embodiment, the liquid crystalline composition may include rod type liquid crystals.

The reactive mesogen may be a typical reactive mesogen known to those skilled in the art. However, although the reactive mesogen can easily realize target retardation through alignment and curing, the reactive mesogen has a drawback of high price.

The positive A layer has a slow axis and a fast axis in the in-plane direction thereof. The slow axis of the positive A layer may be tilted at an angle of −1° to 1°, for example, 0°, relative to the light absorption axis) (0°) of the polarizer. Within this range, the effects of the present invention can be easily realized.

In an embodiment, the positive A layer may have a thickness of 50 μm or less, and, in an embodiment, greater than 0 μm to 50 μm, or 10 μm to 50 μm. Within this range, the positive A layer can be used in the viewer-side polarizing plate.

In an embodiment, the first retardation layer may include the positive A layer alone.

In other embodiments, the first retardation layer may include the positive A layer and a first protective layer stacked on at least one surface of the positive A layer. The first protective layer will be described in further detail below.

Second Retardation Layer

The second retardation layer includes a positive C layer. The positive C layer satisfies a relation: nz>nx≈ny (where nx, ny, and nz are the indexes of refraction of the positive C retardation layer in the slow axis direction, the fast axis direction, and the thickness direction thereof at a wavelength of 550 nm, respectively).

The positive C layer may facilitate improvement in screen quality through reduction in degree of lateral color shift when applied to a liquid crystal display, for example, a liquid crystal display in an IPS, FFS or FLC mode.

In an embodiment, the positive C layer may have an out-of-plane retardation at a wavelength of 550 nm of −140 nm to −10 nm, for example, −140 nm, −135 nm, −130 nm, −125 nm, −120 nm, −115 nm, −110 nm, −105 nm, −100 nm, −95 nm, −90 nm, −85 nm, −80 nm, −75 nm, −70 nm, −65 nm, −60 nm, −55 nm, −50 nm, −45 nm, −40 nm, −35 nm, −30 nm, −25 nm, −20 nm, −15 nm, or −10 nm, and, in an embodiment, −120 nm to −45 nm, −110 nm to −55 nm, −100 nm to −65 nm, −100 nm to −70 nm, or −100 nm to −80 nm. Within this range, the viewer-side polarizing plate can easily satisfy Relation 1 and can improve screen quality through reduction in lateral color shift.

In an embodiment, the positive C layer may have an in-plane retardation of 0 nm to 10 nm, and, in an embodiment, 0 nm to 8 nm, or 0 to 5 nm, at a wavelength of 550 nm. Within this range, the positive C layer may have no influence on light entering or emitted from the positive C layer.

In an embodiment, the positive C layer may have a thickness of 10 μm or less. Within this range, the positive C layer can achieve the above out-of-plane retardation and thickness reduction. In an embodiment, the positive C layer may have a thickness of greater than 0 μm to 10 μm, or 0.5 μm to 10 μm.

In an embodiment, the positive C layer may be a liquid crystal layer, which contains a liquid crystalline polymer or a monomer forming the liquid crystalline polymer.

In other embodiments, the positive C layer may be a non-liquid crystalline layer, which does not contain a liquid crystalline polymer or a monomer forming the liquid crystalline polymer.

For example, a composition for the positive C layer may contain at least one compound selected from among a cellulose ester based compound or a polymer thereof and an aromatic based compound or a polymer thereof. In an embodiment, the positive C layer contains at least one compound selected from among the cellulose ester based compound or a polymer thereof and the aromatic based compound or a polymer thereof. At least one compound selected from among the cellulose ester based compound or a polymer thereof and the aromatic based compound or a polymer thereof can easily form the positive C layer.

Next, the cellulose ester based compound will be described.

The cellulose ester compound may include at least one selected from among a cellulose ester based resin, a cellulose ester based oligomer, and a cellulose ester based monomer.

The cellulose ester based compound may include a condensation product obtained through reaction between a hydroxyl group on a cellulose ester and carboxylic acid or carboxylic anhydride.

The cellulose ester based compound may be regioselectively or randomly substituted. Regioselectivity may be measured by determining a relative degree of substitution at the positions of $C_6$, $C_3$ and $C_2$ on the cellulose ester by carbon 13 NMR. The cellulose ester based compound may be prepared by a typical method through contact between a cellulose solution and at least one $C_1$ to $C_{20}$ acylation agent for a sufficient contact time to provide a cellulose ester having a desired degree of substitution and a desired degree of polymerization.

The acylation agent may include at least one linear or branched $C_1$ to $C_{20}$ alkyl or aryl carboxylic anhydride, carboxylic acid halide, diketone, or acetoacetic ester. Examples of the carboxylic anhydride may include acetic anhydride, propionic anhydride, butyric anhydride, isobutyric anhydride, valeric anhydride, hexanoic anhydride, 2-ethylhexanoic anhydride, nonanoic anhydride, lauric anhydride, palmitic anhydride, stearic anhydride, benzoic anhydride, substituted benzoic anhydride, phthalic anhydride, and isophthalic anhydride. Examples of the carboxylic acid halide may include acetyl, propionyl, butyryl, hexanoyl, 2-ethylhexanoyl, lauroyl, palmitoyl, benzoyl, substituted benzoyl, and stearoyl chlorides. Examples of the acetoacetic ester may include methyl acetoacetate, ethyl acetoacetate, propyl acetoacetate, n-butyl acetoacetate, and tertiary butyl acetoacetate. In an embodiment, the acylation agent includes linear or branched $C_2$ to $C_{20}$ alkyl carboxylic acid anhydrides, such as acetic anhydride, propionic anhydride, butyric anhydride, 2-ethylhexanoic anhydride, nonanoic anhydride, stearic anhydride, and the like.

The cellulose ester compound may include, for example, cellulose acetate (CA), cellulose acetate propionate (CAP), and cellulose acetate butyrate (CAB), without being limited thereto.

In an embodiment, the cellulose ester compound may include at least two acyl group substituents. At least one of the acyl groups may include an aromatic substituent and, in the cellulose ester compound, a relative degree of substitution (RDS) may be set in the order of C6>C2>C3. C6 means a degree of substitution at the position of the number 6 carbon in the cellulose ester, C2 means a degree of substitution at the number 2 carbon in the cellulose ester, and C3 means a degree of substitution at the number 3 carbon in the cellulose ester. In an embodiment, the aromatic compound may include benzoate or substituted benzoate.

In another embodiment, the cellulose ester compound may include a regioselectively substituted cellulose ester compound having (a) a plurality of chromophore-acyl substituents and (b) a plurality of pivaloyl substituents.

In an embodiment, the cellulose ester compound may have a degree of hydroxyl group substitution of about 0.1 to about 1.2 and a degree of chromophore-acyl substitution of about 0.4 to about 1.6; a difference between a total sum of the degree of chromophore-acyl substitution at the number 2 carbon in the cellulose ester compound and the degree of chromophore-acyl substitution at the number 3 carbon in the cellulose ester compound and the degree of chromophore-acyl substitution at the number 6 carbon in the cellulose ester compound may be in a range from about 0.1 to about 1.6; and the chromophore-acyl may be selected from among the following (i), (ii), (iii), and (iv):

(i) ($C_6$ to $C_{20}$) aryl-acyl, where aryl is unsubstituted or substituted with 1 to 5 $R^1$s;

(ii) hetero-aryl, where hetero-aryl is a five to ten-membered ring having 1 to 4 hetero atoms selected from among N, O and S, and is unsubstituted or substituted with 1 to 5 $R^1$s;

(iii)

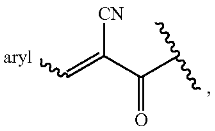

where aryl is a $C_1$ to $C_6$ aryl and is unsubstituted or substituted with 1 to 5 $R^1$s; and (iv)

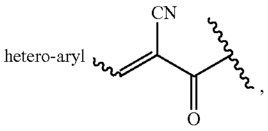

where heteroaryl is a five to ten-membered ring having 1 to 4 hetero atoms selected from among N, O and S, and is unsubstituted or substituted with 1 to 5 $R^1$s, $R^1$s being each independently nitro, cyano, ($C_1$ to $C_6$)alkyl, halo($C_1$ to $C_6$)alkyl, ($C_6$ to $C_{20}$) aryl-$CO_2$—, ($C_6$ to $C_{20}$) aryl, ($C_1$ to $C_6$) alkoxy, halo($C_1$ to $C_6$) alkoxy, halo, five to ten-membered heteroaryl having 1 to 4 hetero atoms selected from among N, O and S, or,

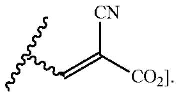

In an embodiment, the chromophore-acyl may be unsubstituted or substituted benzoyl or unsubstituted or substituted naphthyl.

In an embodiment, the chromophore-acyl may be selected from the group consisting of:

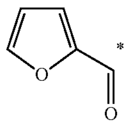 , 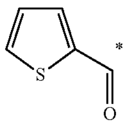 , 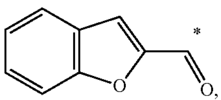

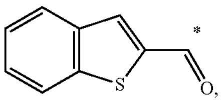 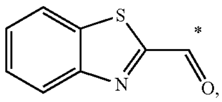

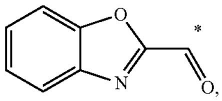 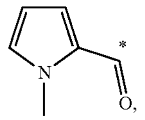

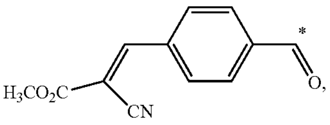 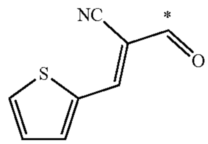 ,

-continued

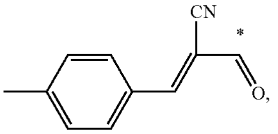

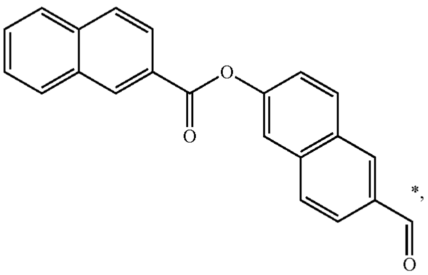

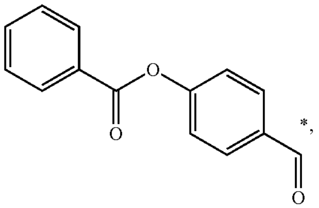

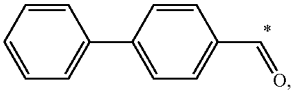

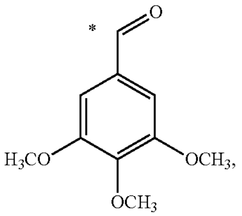

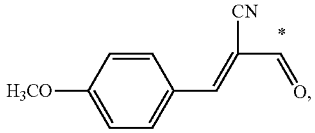

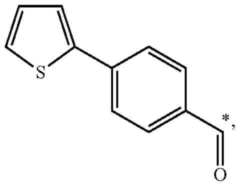

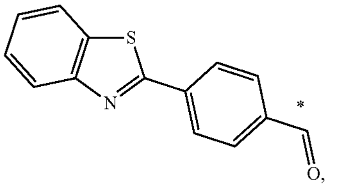

or

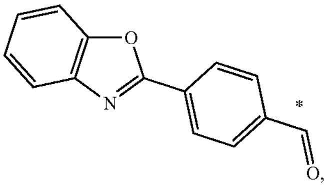

where * indicates a linking site of the chromophore-acyl substituent to oxygen of the cellulose ester.

In another embodiment, the cellulose ester based compound may include an ester based compound having an acyl unit, in which at least some hydrogens of some hydroxyl groups [a $C_2$ hydroxyl group, a $C_3$ hydroxyl group or a $C_6$ hydroxyl group] of a sugar monomer constituting cellulose are unsubstituted or substituted, as represented by the following Formula 1:

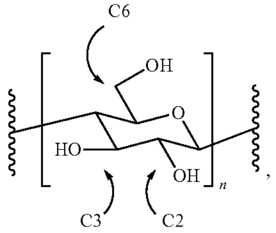

where n is an integer of 1 or more.

A substituent group for the cellulose ester based compound or the acyl unit may include at least one selected from among a halogen atom, a nitro group, an alkyl group (for example, a $C_1$ to $C_{20}$ alkyl group), an alkenyl group (for example, a $C_2$ to $C_{20}$ alkenyl group), a cycloalkyl group (for example, a $C_3$ to $C_{10}$ cycloalkyl group), an aryl group (for example, a $C_6$ to $C_{20}$ aryl group), a heteroaryl group (for example, a $C_3$ to $C_{10}$ aryl group), an alkoxy group (for example, a $C_1$ to $C_{20}$ alkoxy group), an acyl group, and a halogen-containing functional group. The substituent groups may be the same as or different from each other.

Herein, "acyl" may mean R—C(═O)—* (* being a linking site, R being a $C_1$ to $C_{20}$ alkyl group, a $C_3$ to $C_{20}$ cycloalkyl group, a $C_6$ to $C_{20}$ aryl group, or a $C_7$ to $C_{20}$ arylalkyl group), as well-known in the art. The "acyl" is coupled to a ring of the cellulose through ester bonding (through an oxygen atom) in the cellulose.

Here, "alkyl," "alkenyl," "cycloalkyl," "aryl," "heteroaryl," "alkoxy," and "acyl" refer to non-halogen based compounds for convenience. The composition for the second retardation layer may include the cellulose ester compound alone or a mixture including the cellulose ester compound.

Here, "halogen" means fluorine (F), Cl, Br, or I, and, in an embodiment, F.

The "halogen-containing functional group" is an organic functional group containing at least one halogen atom and may include an aromatic, aliphatic, or alicyclic functional group. For example, the halogen-containing functional group may mean a halogen-substituted $C_1$ to $C_{20}$ alkyl group, a halogen-substituted $C_2$ to $C_{20}$ alkenyl group, a halogen-substituted $C_2$ to $C_{20}$ alkynyl group, a halogen-substituted $C_3$ to $C_{10}$ cycloalkyl group, a halogen-substituted $C_1$ to $C_{20}$ alkoxy group, a halogen-substituted acyl group, a halogen-substituted $C_6$ to $C_{20}$ aryl group, or a halogen-substituted $C_7$ to $C_{20}$ arylalkyl group, without being limited thereto.

The "halogen-substituted acyl group" may be R'—C(═O)—* (* being a linking site, R' being a halogen-substituted $C_1$ to $C_{20}$ alkyl group, a halogen-substituted $C_3$ to $C_{20}$ cycloalkyl, a halogen-substituted $C_6$ to $C_{20}$ aryl, or a halogen-substituted $C_7$ to $C_{20}$ arylalkyl). The "halogen-substituted acyl group" may be coupled to a ring of the cellulose through ester bonding (through an oxygen atom) in the cellulose.

In an embodiment, the composition for the positive C layer includes a cellulose ester based compound substituted with an acyl group, a halogen, or a halogen-containing functional group. In an embodiment, the halogen is fluorine. In an embodiment, the halogen may be present in an amount of 1 wt % to 10 wt % in the cellulose ester based compound. Within this range, the composition allows easy formation of the positive C layer.

For formation of the positive C layer, the cellulose ester based compound may be prepared by a typical method known to those skilled in the art or may be obtained from commercially available products. For example, the cellulose ester based compound having an acyl group as a substituent group may be prepared by reacting trifluoroacetic acid or trifluoroacetic anhydride with the sugar monomer constituting the cellulose represented by Formula 1 or a polymer of the sugar monomer, by reacting trifluoroacetic acid or trifluoroacetic anhydride therewith, followed by additionally reacting an acylation agent (for example, an anhydride of carboxylic acid, or carboxylic acid) therewith, or by reacting both trifluoroacetic acid or trifluoroacetic anhydride and the acylation agent therewith.

Next, the aromatic based compound will be described.

The aromatic based compound includes a phenyl group and may include a polystyrene based compound or a fluorobenzene or difluorobenzene structure, without being limited thereto. In an embodiment, the polystyrene based compound may include a moiety represented by the following Formula 2:

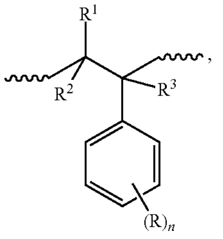

where  is a linking site of an element; $R^1$, $R^2$ and $R^3$ are each independently a hydrogen atom, an alkyl group, a substituted alkyl group, or a halogen; Rs are each independently a substituent group on a styrene ring; and n is an integer of 0 to 5 indicating the number of substituent groups on the styrene ring.

Examples of the substituent group R on the styrene ring may include an alkyl group, a substituted alkyl group, a halogen atom, a hydroxyl group, a carboxyl group, a nitro group, an alkoxy group, an amino group, a sulfonate group, a phosphate group, an acyl group, an acyloxy group, a phenyl group, an alkoxycarbonyl group, and a cyano group. Here, "substituted" in the "substituted alkyl group" means that a hydrogen atom is substituted with any one of these substituent groups.

In an embodiment, at least one of $R^1$, $R^2$ and $R^3$ may be a halogen, and, in an embodiment, fluorine.

The compound for the positive C layer may further include a solvent. The solvent may include at least one organic solvent selected from among propylene glycol methyl ether, propylene glycol methyl ether acetate (PGMEA), methyl isopropyl ketone, methyl isobutyl ketone, toluene, xylene, methyl ethyl ketone, methanol, ethyl acetate, dichloromethane, cyclopentanone, tetrahydrofuran, and methyl tert-butyl ether, without being limited thereto.

The compound for the positive C layer may further include an aromatic fused ring-containing compound. The aromatic fused ring-containing compound may adjust out-of-plane retardation and wavelength dispersion of the positive C layer. In an embodiment, the aromatic fused ring-containing compound includes naphthalene, anthracene, phenanthrene, pyrene, a compound represented by the following Structure 1, or a compound represented by the following Structure 2. The aromatic fused ring-containing compound may include 2-naphthyl benzoate, 2,6-naphthalene dicarboxylic acid diester represented by the following Structure 3, naphthalene, and an abietic acid ester represented by Structure 4, without being limited thereto:

Structure 1

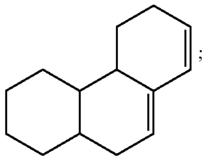

;

Structure 2

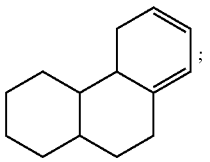

;

Structure 3

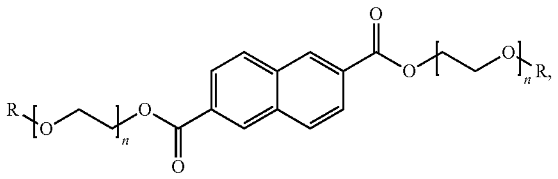

where R is a $C_1$ to $C_{20}$ alkyl group or a $C_6$ to $C_{20}$ aryl group and n is an integer of 0 to 6;

Structure 4

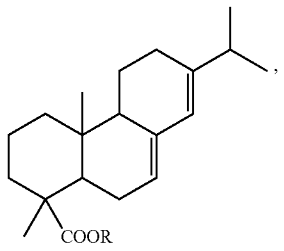

where R is a $C_1$ to $C_{20}$ alkyl group or a $C_6$ to $C_{20}$ aryl group.

In an embodiment, the aromatic fused-ring containing additive includes at least one selected from among naphthalene, anthracene, phenanthrene, pyrene, 2-naphthyl benzoate, and 2,6-naphthalene dicarboxylic acid diester represented by Structure 3.

In an embodiment, the aromatic fused-ring containing additive may be optionally present in an amount of 30 wt % or less, and, in an embodiment, 0.1 wt % to 30 wt %, and, in an embodiment, 10 wt % to 30 wt %, in the positive C layer. Within this range, the additive can improve thermal stability of the composition and retardation of the polarizing plate per unit thickness, and can adjust wavelength dispersion.

The composition for the positive C layer may further include additives, for example, plasticizers, stabilizers, UV absorbents, anti-blocking agents, slipping agents, lubricants, dyes, pigments, retardation enhancers, and the like, without being limited thereto.

In an embodiment, the second retardation layer may comprise the positive C layer alone.

In other embodiments, the second retardation layer may include the positive C layer and a second protective layer stacked on at least one surface of the positive C layer. The second protective layer will be described below.

The first retardation layer and the second retardation layer may be coupled to each other via an adhesive layer or a bonding layer.

Protective Layer (First Protective Layer or Second Protective Layer)

The protective layer may be provided to the first retardation layer or the second retardation layer to increase mechanical strength of the polarizer, or may become a base film forming the positive A layer or the positive C layer.

The protective layer may be an optically transparent film. For example, the protective layer may have a total light transmittance of 90% or more, for example, 90% to 100%. Within this range, the protective layer can have no influence on light having entered the polarizer and emitted therefrom.

The protective layer may include an optically anisotropic film or an optically isotropic film.

In an embodiment, the protective layer may have an in-plane retardation of 10 nm or less, for example, 0 nm to 10 nm, at a wavelength of 550 nm. Within this range, the protective layer may have no influence on light entering or emitted from the positive C retardation layer.

In an embodiment, the protective layer may have an out-of-plane retardation of −10 nm to 10 nm, for example, 0 nm to 5 nm, at a wavelength of 550 nm. Within this range, the protective layer can have no influence on light entering the polarizer and/or on light entering or emitted from the positive C retardation layer.

The protective layer may include a film including at least one selected from among cellulose ester based resins including triacetylcellulose and the like; cyclic polyolefin (COP) based resins including norbornane; amorphous cyclic polyolefin, and the like; polycarbonate based resins; polyester based resins including polyethylene terephthalate; polybutylene terephthalate; polyethylene naphthalate; polybutylene terephthalate, and the like; polyethersulfone based resins; polysulfone based resins; polyamide based resins; polyimide based resins; non-cyclic polyolefin based resins; poly(meth) acrylate based resins including poly(methyl (meth)acrylate) resins and the like; polyvinyl alcohol based resins; polyvinyl chloride based resins; polyvinylidene chloride based resins; and acrylic based resins.

Polarizer

The polarizer is an absorption type polarizer that divides incident light into two polarized components orthogonal to each other to transmit one polarized light component while absorbing the other polarized light component.

In an embodiment, the polarizer may have a light transmittance of 40% or more, and, in an embodiment, 40% to 45%. In an embodiment, the polarizer may have a degree of polarization of 95% or more, and, in an embodiment, 95% to 100%, and, in an embodiment, 98% to 100%. Within this range, the polarizer can further improve frontal contrast and durability.

The polarizer may include a uniaxially stretched polarizer containing dichroic dyes. In an embodiment, the polarizer containing dichroic dyes may include a polarizer manufactured through MD uniaxial stretching of a base film for polarizers, followed by dyeing the base film with the dichroic dyes (for example, iodine or iodine-containing potassium iodide). The base film for polarizers may include a polyvinyl alcohol based film or a derivative thereof, without being limited thereto. The polarizer may be manufactured by a typical method known to those skilled in the art.

In an embodiment, the polarizer may have a thickness of 1 μm to 40 μm, and, in an embodiment, 5 μm to 30 μm, and, in an embodiment, 10 μm to 25 μm. Within this range, the polarizer may be used in the polarizing plate.

In an embodiment, the viewer-side polarizing plate may further include a third protective layer on a light exit surface of the polarizer.

Third Protective Layer

The third protective layer is disposed on an upper surface (light exit surface) of the polarizer to protect the polarizer. The third protective layer can provide the effects of improving frontal contrast ratio, lateral color shift and black visibility through adjustment of an angle between axes described below.

In an embodiment, the third protective layer may include an optically isotropic film.

In another embodiment, the third protective layer may include an optically anisotropic film.

The third protective layer may have an axis having a high index of refraction and an axis having a low index of refraction in the in-plane direction. Here, "axis having a high index of refraction" and "axis having a low index of refraction" are defined by comparing the indexes of refraction among two axes of the in-plane direction of the third protective layer, that is, the x-axis and the y-axis thereof. Although not particularly limited, the axis having a high index of refraction and the axis having a low index of refraction in the in-plane direction of the third protective layer may be formed by a stretching process among processes of manufacturing the protective layer. For example, the axis having a high index of refraction may be the slow axis, and the axis having a low index of refraction may be the fast axis. In order to have the axis having a low index of refraction and the axis having a high index of refraction in the in-plane direction, the third protective layer may be a TD-uniaxially stretched protective film or an MD/TD biaxially stretched protective film in which the stretching ratio in the TD is greater than the stretching ratio in the MD.

Assuming that the axis having a high index of refraction (light absorption axis) in the in-plane direction of the polarizer is a reference) (0°), the axis having a low index of refraction in the in-plane direction of the third protective layer is tilted at an angle of −10° to +10° with respect to the reference. Within this range, the third protective layer can effectively suppress rainbow mura.

As used herein to represent an angle, "+" means an angle in the clockwise direction and "−" means an angle in the counterclockwise direction when the reference is 0°. In the in-plane direction of the polarizer, the axis having a high index of refraction may correspond to the machine direction (MD) of the polarizer, and the axis having a low index of refraction may correspond to the transverse direction (TD) of the polarizer.

In an embodiment, the third protective layer may have an in-plane retardation (Re) of 5,000 nm or greater, and, in an embodiment, 5,000 nm to 15,000 nm, and, in an embodiment, 5,000 nm to 12,000 nm, at a wavelength of 550 nm. Within this range, the third protective layer can effectively suppress rainbow mura. In an embodiment, the third protective layer may have an out-of-plane retardation (Rth) of 6,000 nm or greater, and, in an embodiment, 6,000 nm to 15,000 nm, and, in an embodiment, 6,000 nm to 12,000 nm, at a wavelength of 550 nm. Within this range, the third protective layer can suppress generation of spots due to birefringence while securing improvement in viewing angle of a liquid crystal display. In an embodiment, the third protective layer may have a degree of biaxiality (NZ) of 2.5 or less, and, in an embodiment, 1.0 to 2.2, and, in an embodiment, 1.2 to 2.0, and, in an embodiment, 1.3 to 1.6, at a wavelength of 550 nm. Within this range, the third protective layer can suppress generation of spots due to birefringence while maintaining mechanical strength thereof.

In an embodiment, the third protective layer may include a film formed of an optically transparent resin. For example, the third protective layer may include a protective film including at least one selected from among cellulose ester based resins including triacetylcellulose and the like; cyclic polyolefin based resins including norbornene; amorphous cyclic polyolefin, and the like; polycarbonate based resins; polyester based resins including polyethylene terephthalate; polybutylene terephthalate; polyethylene naphthalate; polybutylene naphthalate, and the like; polyether sulfone based resins; polysulfone based resins; polyamide based resins; polyimide based resins; non-cyclic polyolefin based resins; poly(meth)acrylate based resins including poly(methyl (meth)acrylate) and the like; polyvinyl alcohol based resins; polyvinyl chloride based resins; and polyvinylidene chloride based resins, without being limited thereto.

The third protective layer may have a monolayer structure or may include a laminate of monolayer resin films or a film formed by integrating multiple layers through coextrusion.

In another embodiment, the third protective layer may be a protective coating layer. The protective coating layer may be formed of a typical composition known to those skilled in the art.

In an embodiment, the third protective layer may have a thickness of 1 μm to 100 μm, and, in an embodiment, 5 μm to 100 μm, and, in an embodiment, 10 μm to 90 μm, and, in an embodiment, 15 μm to 85 μm. Within this range, the third protective layer can be used in the polarizing plate.

The polarizing plate may further include functional coating layers, such as a hard-coating layer, an anti-fingerprint layer, an antireflection layer, and the like, on an upper surface of the third protective film. In addition, the polarizer may be stacked on the third protective layer via an adhesive layer and/or a bonding layer.

Light Source-Side Polarizing Plate

The light source-side polarizing plate may include a polarizer, a protective layer stacked on a light incidence surface of the polarizer, and a protective layer stacked on a light exit surface of the polarizer. Here, the protective layer on the light incidence surface of the polarizer may be the first protective layer, the second protective layer, or the third protective layer described above. Further, the protective layer on the light exit surface of the polarizer may be the first protective layer, the second protective layer, or the third protective layer described above.

In the optical display apparatus, the light absorption axis of the polarizer of the light source-side polarizing plate may be substantially orthogonal to the light absorption axis of the polarizer of the viewer-side polarizing plate. As used herein, "substantially orthogonal" means that the light absorption axis of the polarizer of the light source-side polarizing plate and the light absorption axis of the polarizer of the viewer-side polarizing plate define an angle of 85° to 95°, for example, 90°, therebetween.

FIG. 1 is a cross-sectional view of an optical display apparatus according to an embodiment of the present invention.

Referring to FIG. 1, a liquid crystal display may include a liquid crystal panel 100, a viewer-side polarizing plate stacked on a surface of the liquid crystal panel 100, and a light source-side polarizing plate 200 stacked on another surface of the liquid crystal panel 100, wherein the viewer-side polarizing plate may include a positive A layer 10, a positive C layer 20, a polarizer 30, and a protective layer 40 stacked sequentially from the liquid crystal panel 100.

Next, the present invention will be described in further detail with reference to some examples. However, it is to be understood that these examples are provided for illustration and are not to be construed in any way as limiting the present invention.

Example 1

A polarizer (thickness: 17 μm, index of refraction: 1.52) was prepared by uniaxially stretching a polyvinyl alcohol based film (VF-TS #4500, thickness: 45 μm, Kuraray Co., Ltd.) to two times an initial length thereof in the MD at 30° C., adsorbing iodine to the stretched film, and further stretching the film in an aqueous solution of boric acid and having a temperature of 60° C.

A positive C layer was formed on a base film (triacetylcellulose film, in-plane retardation @550 nm: 5 nm) by depositing a composition for the positive C layer [fluorine-containing polystyrene-based polymer, VM500, Eastman Co., Ltd.] onto the base film, followed by drying the composition.

A cyclic olefin polymer (COP) film (ZM film, Zeon Co., Ltd.) uniaxially stretched in the MD was used as a positive A layer (negative wavelength dispersion).

The positive C layer and the positive A layer were bonded to each other via an adhesive layer, thereby preparing a laminate having the positive C layer and the positive A layer sequentially stacked on the base film.

A viewer-side polarizing plate was manufactured by stacking the laminate on a lower surface of the prepared polarizer such that the base film was stacked on the polarizer, followed by stacking a protective layer (polyethylene terephthalate film) on the other surface of the polarizer. When the light absorption axis of the polarizer of the viewer-side polarizing plate is 0°, the slow axis of the positive A layer is 0°, that is, parallel thereto.

An IPS liquid crystal panel was prepared with a liquid crystal layer having a pre-tilt angle of 3°, as shown in Table 1 below.

A light source-side polarizing plate was manufactured by fabricating a polarizer in the same manner as above, stacking a triacetylcellulose film (in-plane retardation @550 nm: 0 nm) on one surface of the polarizer, and stacking a protective layer (polyethylene terephthalate film) on the other surface of the polarizer.

An optical display module was manufactured by stacking the viewer-side polarizing plate on a light exit surface of the liquid crystal panel (such that the positive A layer of the viewer-side polarizing plate is closest to the liquid crystal panel) and stacking the light source-side polarizing plate on a light incidence surface thereof (such that the triacetylcellulose film of the light source-side polarizing plate is closest to the liquid crystal panel).

Examples 2 to 4

Optical display modules were manufactured in the same manner as in Example 1 except that the configurations of the positive C layer and the positive A layer were changed as listed in Table 1.

Comparative Example 1

An optical display module was manufactured in the same manner as in Example 1 except that a viewer-side polarizing plate (polarizer with a polyethylene terephthalate film-polarizer-triacetylcellulose film sequentially stacked) was used without the positive C layer and the positive A layer of the viewer-side polarizing plate of Example 1.

Comparative Examples 2 and 3

Optical display modules were manufactured in the same manner as in Example 1 except that the configurations of the positive C layer and the positive A layer of the viewer-side polarizing plate were changed as listed in Table 1.

Figure 2:
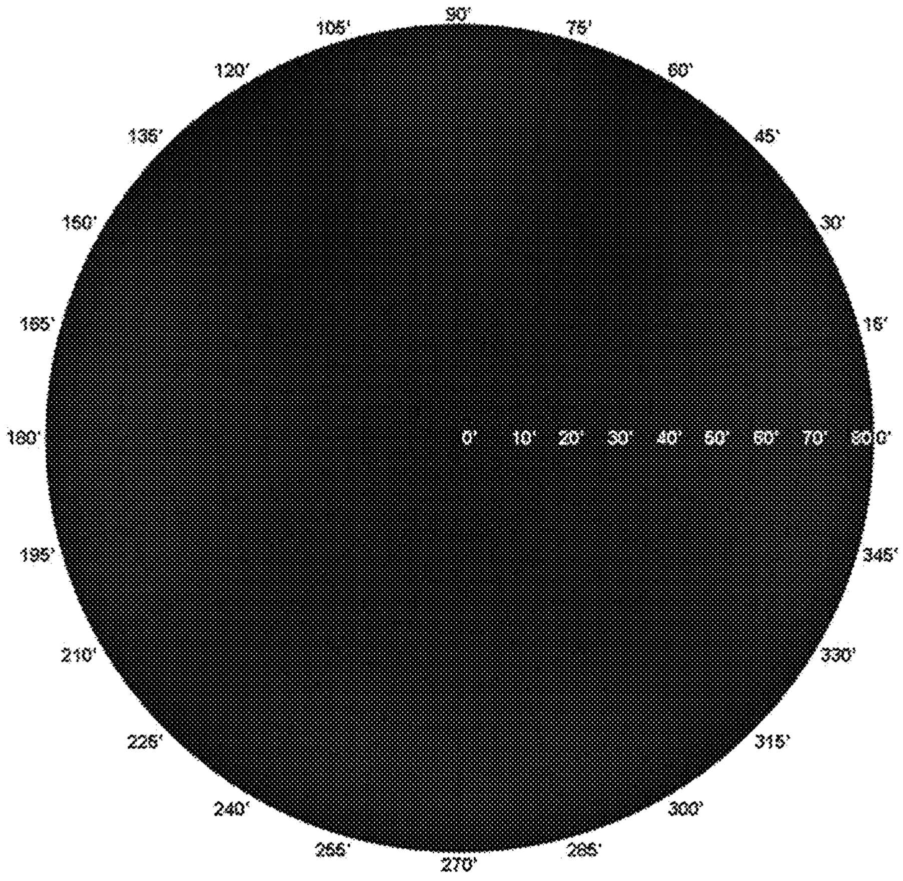
FIG. 2 shows a result indicating no occurrence of a reddish region in an Example 1.

The polarizing plates of the Examples and Comparative Examples were evaluated as to properties of Table 1, and evaluation results are shown in Table 1, FIG. 2 and FIG. 3.

(1) Max b* value among color values: The Max b* value was calculated with a simulation program (Techwiz 1D). The Max b* value was calculated in 1° increments over the range of 0° to 89° for incident angle and 0° to 359° for alignment angle. This calculation is for reference only. Depending on the transmittance spectrum of the polarizer and the degrees of diffusion and absorption of various elements in a panel, different values are obtained. Therefore, the lower the Max b* value, the less red color is visible.

(2) Visibility evaluation: Each of the viewer-side polarizing plates manufactured in the Examples and Comparative Examples was attached to an FFS mode panel (BOE, China) and evaluated with the naked eye.

TABLE 1

| | | Example | | | | Comparative Example | | |
|---|---|---|---|---|---|---|---|---|
| | | 1 | 2 | 3 | 4 | 1 | 2 | 3 |
| Pre-tilt angle of liquid crystal layer (°) | | 3 | 3 | 3 | 3 | 3 | 3 | 3 |
| Positive C layer | Rth2(nm) | −90 | −100 | −90 | −90 | — | −70 | −70 |
| Positive A layer | Re1(nm) | 130 | 130 | 140 | 115 | — | 120 | 130 |
| Max b* value among color values | | 2.13 | 2.38 | 1.61 | 3.85 | 4.22 | 4.52 | 4.48 |
| Visibility evaluation | | No reddish region + good black visibility | No reddish region + good black visibility | No reddish region + good black visibility | Weak reddish region + good black visibility | No black feeling and low screen quality | Strong reddish region | Strong reddish region |

As shown in Table 1, the polarizing plates according to the present invention had a low Max b* value, indicating a low degree of occurrence of a reddish region due to the liquid crystal layer, and good screen quality with good black visibility.

By contrast, the polarizing plates of the Comparative Examples failing to satisfy Equation 1 or not provided with the positive C layer and the positive A layer did not achieve the effects of the present invention.

As shown in FIG. 2, it could be seen that the polarizing plates according to the present invention did not suffer from occurrence of a reddish region due to the liquid crystal layer. By contrast, as shown in FIG. 3, it could be seen that the polarizing plates of the Comparative Examples suffered from occurrence of the reddish region.

It is to be understood that while some embodiments have been described herein, various modifications, changes, alterations, and equivalent embodiments can be made by those skilled in the art without departing from the spirit and scope of the present invention.

What is claimed is:

1. An optical display apparatus comprising: a liquid crystal panel; and a viewer-side polarizing plate stacked on one a surface of the liquid crystal panel, wherein the liquid crystal panel comprises a liquid crystal layer having a pre-tilt angle of 2° to 5°; and the viewer-side polarizing plate comprises a first retardation layer comprising a positive A layer; a second retardation layer comprising a positive C layer; and a polarizer stacked sequentially from the liquid crystal panel, wherein the first retardation layer and the second retardation layer are configured to satisfy the following Relation 1:

$$Re1 - 205\ \text{nm} \geq Rth2 \quad \text{[Relation 1]}$$

where Re1 is an in-plane retardation of the first retardation layer at a wavelength of 550 nm (unit: nm), and Rth2 is an out-of-plane retardation of the second retardation layer at the wavelength of 550 nm (unit: nm), wherein the positive A layer has an in-plane retardation of 100 nm to 160 nm at the wavelength of 550 nm, and an out-of-plane retardation of 50 nm to 80 nm at the wavelength of 550 nm, wherein the positive C layer comprises at least one compound selected from among a cellulose ester based compound or a polymer thereof and an aromatic based compound or a polymer thereof, the aromatic based compound comprising a polystyrene based compound, a fluorobenzene structure, or a difluorobenzene structure, and the positive C layer does not contain a liquid crystalline polymer or a monomer for forming the liquid crystalline polymer;

wherein the optical display apparatus is configured to suppress occurrence of a reddish region caused by the liquid crystal layer.

2. The optical display apparatus as claimed in claim 1, wherein Re1−205 nm ranges from −100 nm to −60 nm.

3. The optical display apparatus as claimed in claim 1, wherein the liquid crystal layer or the liquid crystal panel has an in-plane retardation of 330 nm to 380 nm at the wavelength of 550 nm.

4. The optical display apparatus as claimed in claim 1, wherein the liquid crystal layer is a liquid crystal layer in a horizontal alignment mode.

5. The optical display apparatus as claimed in claim 1, wherein the liquid crystal layer is formed by physical alignment.

6. The optical display apparatus as claimed in claim 1, wherein the liquid crystal panel comprises the liquid crystal layer and an alignment layer formed on one surface of the liquid crystal layer and subjected to rubbing treatment.

7. The optical display apparatus as claimed in claim 1, wherein the liquid crystal layer has positive birefringence.

8. The optical display apparatus as claimed in claim 1, wherein the positive A layer has an in-plane retardation of 110 nm to 160 nm at the wavelength of 550 nm.

9. The optical display apparatus as claimed in claim 1, wherein a slow axis of the positive A layer is tilted at an angle of −1° to 1° with respect to a light absorption axis (0°) of the polarizer.

10. The optical display apparatus as claimed in claim 1, wherein the positive A layer has negative wavelength dispersion.

11. The optical display apparatus as claimed in claim 1, wherein the positive C layer has an out-of-plane retardation of −140 nm to −10 nm at the wavelength of 550 nm.

12. The optical display apparatus as claimed in claim 1, wherein the second retardation layer comprises the positive C layer alone or comprises the positive C layer and a second protective layer stacked on at least one surface of the positive C layer.

13. The optical display apparatus as claimed in claim 1, wherein the first retardation layer comprises the positive A layer alone, or comprises the positive A layer and a first protective layer stacked on at least one surface of the positive A layer.

14. The optical display apparatus as claimed in claim 13, wherein the first retardation layer comprises the positive A layer and the first protective layer stacked on at least one surface of the positive A layer, and wherein the first protective layer has an in-plane retardation of 10 nm or less at the wavelength of 550 nm.

15. The optical display apparatus as claimed in claim 1, wherein only the first retardation layer and the second retardation layer are present as retardation layers between the polarizer and the liquid crystal panel.

* * * * *